US005694556A

United States Patent [19]
Neal et al.

[11] Patent Number: 5,694,556
[45] Date of Patent: Dec. 2, 1997

[54] DATA PROCESSING SYSTEM INCLUDING BUFFERING MECHANISM FOR INBOUND AND OUTBOUND READS AND POSTED WRITES

[75] Inventors: Dan M. Neal, Round Rock; Edward J. Silha; Steven M. Thurber, both of Austin, all of Tex.

[73] Assignee: International Business Machines Corporation, Armonk, N.Y.

[21] Appl. No.: 472,603

[22] Filed: Jun. 7, 1995

[51] Int. Cl.$^6$ .................................................. G06F 13/14
[52] U.S. Cl. .......................................................... 395/308
[58] Field of Search ................................ 395/306, 308, 395/309, 293, 872

[56] References Cited

U.S. PATENT DOCUMENTS

| | | | |
|---|---|---|---|
| 4,009,347 | 2/1977 | Flemming et al. | 179/15 BS |
| 4,156,796 | 5/1979 | O'Neal et al. | 178/3 |
| 4,188,665 | 2/1980 | Nagel et al. | |
| 4,335,426 | 6/1982 | Maxwell et al. | |
| 4,354,229 | 10/1982 | Davis et al. | |
| 4,363,093 | 12/1982 | Davis et al. | |
| 4,371,962 | 2/1983 | Zeitraeg | 370/100 |
| 4,394,733 | 7/1983 | Swenson | |
| 4,428,066 | 1/1984 | Kihara et al. | 365/96 |
| 4,597,077 | 6/1986 | Nelson et al. | 370/88 |
| 4,701,864 | 10/1987 | Takashima et al. | 364/521 |
| 4,891,792 | 1/1990 | Hanamura et al. | 365/189.05 |
| 4,893,307 | 1/1990 | McKay et al. | 370/94.1 |
| 4,972,368 | 11/1990 | O'Brien et al. | |
| 5,021,949 | 6/1991 | Morten et al. | |
| 5,088,065 | 2/1992 | Hanamura et al. | 365/208 |
| 5,109,515 | 4/1992 | Laggis et al. | |
| 5,133,074 | 7/1992 | Chou | |
| 5,163,048 | 11/1992 | Heutink | 370/85.6 |

(List continued on next page.)

FOREIGN PATENT DOCUMENTS

| | | |
|---|---|---|
| 56-92640 | 7/1981 | Japan. |
| 58-24935 | 2/1983 | Japan. |
| 60-89153 | 5/1985 | Japan. |
| 63-14390 | 1/1988 | Japan. |
| 4-2236 | 1/1992 | Japan. |
| 4-150536 | 5/1992 | Japan. |
| 4-229792 | 8/1992 | Japan. |
| 5-048637 | 2/1993 | Japan. |
| 5-160836 | 6/1993 | Japan. |

OTHER PUBLICATIONS

IBM Technical Disclosure Bulletin, vol. 37, No. 9, Sep. 1994, pp. 435-439, *Peripheral Component Interconnect Daughter-Card Configuration.*

(List continued on next page.)

*Primary Examiner*—Glenn A. Auve
*Attorney, Agent, or Firm*—Raymond M. Galasso; Jenkens & Gilchrist; Anthony V. S. England

[57] ABSTRACT

A data processing system includes a host processor, a number of peripheral devices, and one or more bridges which may connect between the host, peripheral devices and other hosts or peripheral devices such as in a network. Each bus to bus bridge connects between a primary bus and a secondary bus wherein for the purpose of clarity, the primary bus will be considered as the source for outbound transactions and the destination for inbound transactions and the secondary bus would be considered the destination for outbound transactions and the source for inbound transactions. Each bus to bus bridge includes an outbound data path, an inbound data path, and a control mechanism. The outbound data path includes a queued buffer for storing transactions in order of receipt from the primary bus where the requests in the queued buffer may be mixed as between read requests and write transactions, the outbound path also includes a number of parallel buffers for storing read reply data and address information. The inbound path is a minor image of the outbound path with read requests and write requests being stored in a sequential buffer and read replies being stored in a number of parallel buffers. Both the inbound path and the outbound path in the bus to bus bridge are controlled by a state machine which takes into consideration activity in both directions and permits or inhibits bypass transactions.

12 Claims, 3 Drawing Sheets

U.S. PATENT DOCUMENTS

| | | | |
|---|---|---|---|
| 5,177,739 | 1/1993 | Bassneuvo et al. | 370/85.8 |
| 5,206,933 | 4/1993 | Farrell et al. | |
| 5,218,343 | 6/1993 | Stobbe et al. | 340/572 |
| 5,218,680 | 6/1993 | Farrell et al. | |
| 5,247,620 | 9/1993 | Fukuzawa et al. | |
| 5,283,868 | 2/1994 | Baker et al. | |
| 5,297,074 | 3/1994 | Honma | 364/825 |
| 5,317,568 | 5/1994 | Bixby et al. | 370/85.6 |
| 5,317,726 | 5/1994 | Horst. | |
| 5,327,532 | 7/1994 | Ainsworth et al. | |
| 5,333,269 | 7/1994 | Calvignac et al. | |
| 5,359,602 | 10/1994 | Diaz et al. | 370/85.8 |
| 5,367,674 | 11/1994 | Berk et al. | |
| 5,369,749 | 11/1994 | Baker et al. | |
| 5,455,915 | 10/1995 | Coke | 395/293 |
| 5,517,650 | 5/1996 | Bland et al. | 395/750 |
| 5,522,050 | 5/1996 | Amini et al. | 395/306 |
| 5,535,341 | 7/1996 | Shah et al. | 395/306 |

OTHER PUBLICATIONS

IBM Technical Disclosure Bulletin, vol. 35, No. 2, Jul. 1992, pp. 233–239, *Architecture for High Performance Transparent Bridges*.

IBM Technical Disclosure Bulletin, vol. 36, No. 09A, Sep. 1993, pp. 565–566, *Bridge Architecture Including Multiple Instances of a Real–Time Bus*.

IBM Technical Disclosure Bulletin, vol. 37, No. 09, Sep. 1994, pp. 163–167, *External Post Write Buffer Protocol for Personal Computers*.

IBM Technical Disclosure Bulletin, vol. 21, No. 2, Jul. 1978, pp. 463–468, *Auxiliary Buffer Management*.

IBM Technical Disclosure Bulletin, vol. 37, No. 08, Aug. 1994, pp. 619–621, *Method to Initialize the Error Handling Logic of a Peripheral Component Interconnect System*.

"Triple bus architecture in communications controllers," *Electron. Prod. Des.* (UK), vol. 12, No. 1, Jan. 1991, pp. 39–41, M. Hudson.

"Shared Cache Multiprocessing with Pack Computers," *Comput. Archit. News* (USA) vol. 16, No. 3, Jun. 1988, pp. 64–70, S. Lass.

"Single Chip PCI Bridge and Memory Controller for PowerPC™ Microprocessors," *Proceedings IEEE International Conference on Computer Design: VLSI in Computers and Processors*, (Cat. No. 94CH35712), IEEE Comput. Soc. Press, xvii+639, 1994, pp. 409–412, M.J. Garcia and B.K. Reynolds.

"Design and Evaluation of the High Performance Multi-Processor Server," *Proceedings IEEE International Conference on Computer Design: VLSI in Computers and Processors*, (Cat. No. 94CH35712), IEEE Comput. Soc. Press, xvii+639, 1994, pp. 66–69, M. Morioka, et al.

"Asymptomatic Performance of a Buffer Model in a Data Sharing Environment," *Perform. Eval. Rev.* (USA), vol. 22, No. 1, May 1994, pp. 67–76, A. Bittan, et al.

"Disk Cache Architectures for Transaction–like Applications in Parallel Computers," *Computing* (Austria), vol. 53, No. 1, 1994, pp. 13–31, H. Eckhardt.

"Efficient Locking and Caching of Data in the Multisystem Shared Disks Transaction Environment," *Advances in Database Technology—EDBT '92, 3rd International Conference on Extending Database Technology Proceedings, Vienna, Austria, Mar. 23–27, 1992, Springer–Verlag*, xii+551, 1992 pp. 453–468, C. Mohan, et al.

"Design and Analysis of Integrated Concurrency–CoherencyControls," *Morgan Kaufmann*, Los Altos, California, USA, xii+518, 1987, pp. 463–471, D.M. Dias, et al.

DATA PROCESSING SYSTEM INCLUDING BUFFERING MECHANISM FOR INBOUND AND OUTBOUND READS AND POSTED WRITES

BACKGROUND OF THE INVENTION

1. Field of the Invention

The present invention relates to data processing systems, and more particularly to data processing systems including mechanisms for efficiently handling inbound and outbound reads and posted writes from host to peripheral devices.

2. Prior Art

Many standard bus architectures for use in data processing systems such as the Peripheral Component Interconnect (PCI) bus specification contain ordering rules for transactions that traverse a bus to bus bridge. Examples of such transactions are read requests outbound from a host processor to a peripheral device, read replies containing the data from the peripheral device inbound to the host processor or posted writes in which a write command is posted to a buffer in a bus to bus bridge allowing the host to proceed with other processing. A posted write herein means that the write has completed on the initiating bus and is posted in the bus to bus bridge for future completion on the destination bus. Current bus to bus bridge architecture requires write buffers in both outbound (away from the host processor) and inbound (towards the host processor) direction to be flushed out prior to completing a read transaction that traverses the bus to bus bridge. The requirement to flush the buffers can create a performance problem for a busy server by holding up the processor read accesses which are Retried if there are any posted writes in the bridge buffers. Retry herein means that the target device being addressed by the master acknowledges the access but signals that it is busy and it terminates the transaction. The master then tries the access again at a later time.

Several prior an bridge architectures attempt to improve performance and eliminate throughput delays.

An article in the IBM Technical Disclosure Bulletin dated July, 1992, at page 233 and following entitled "Architecture for High Performance Transparent Bridges," shows architecture for high performance bridges with multi-pert bridges interconnecting networks including buffering components which guarantee transfer of data whether read or write with uniform handling inside the bridge.

Although the article generally relates to improvement in performance of bridges, the article does not address the problem of requiring buffers to be flushed out prior to completing a read transaction which degrades system performance.

U.S. Pat. No. 5,542,055 (BC993012) entitled "Method and Apparatus for Configuring PCI Bridges on Multiple PCI Buses Environment," shows a method and apparatus for configuring PCI bridges. The patent also shows direct connection to the host system through host bridges with bus to bus bridges and peripheral buses directly connected to a system bus.

While the patent teaches the operation of the industry standard PCI bridge architecture, it does not address nor suggest any solution to the performance problem created by the requirement to flush buffers prior to a read transaction.

U.S. Pat. No. 5,333,269 entitled "Mechanism for Transferring Messages Between Source and Destination Users Through a Shared Memory," teaches a common bus to which a memory with a number of independent buffers, a memory interface and a central control unit are connected. The memory interface receives messages from source users, stores the message in selected buffers, and chains the buffers together. The control apparatus generates inbound message queues and outbound message queues in response to commands which it receives from the memory interface.

Although the patent has some similarities to high performance bus bridge architectures, the patent does not address nor suggest a solution to the problem of requirement for flushing out buffers prior to completing a read transaction which follows a posted write transaction.

U.S. Pat. No. 5,247,620 entitled "Bridge Apparatus with an Address Check Circuit for Interconnecting Networks," teaches multiple inbound and outbound buffers for reading out of information from processor to peripheral devices and for bridging in a network environment.

Although the patent shows in FIG. 1 a bus to bus bridge including a buffer memory, the patent does not teach nor suggest a mechanism for improving performance in bus to bus bridges which eliminates the need for flushing out buffers between write and read transactions.

Other prior art patents and publications show various bridges and buffering mechanisms, but none of the prior art teaches nor suggests the performance improvement of eliminating the requirement for flushing out buffers for a read operation following a write operation.

Further, the prior art does not adequately deal with the problem of handling multiple mixed inbound and outbound transactions.

SUMMARY OF THE INVENTION

Therefore, it is an object of the present invention to efficiently handle multiple mixed transactions in both inbound and outbound directions in a bus to bus bridge having a control mechanism for controlling the transmission of read requests, read replies and posted writes in an efficient manner while maintaining a high performance level of the system.

Accordingly, a data processing system includes a host processor, a number of peripheral devices, and one or more bridges which may connect between the host, peripheral devices and other hosts or peripheral devices such as in a network. Each bus to bus bridge connects between a primary bus and a secondary bus wherein for the purpose of clarity, the primary bus will be considered as the source for outbound transactions and the destination for inbound transactions and the secondary bus would be considered the destination for outbound transactions and the source for inbound transactions. Different transactions on the primary "initiating" bus may or may not occur simultaneously to other transactions on the "secondary" bus, depending on implementation. Each bus to bus bridge includes an outbound data path, an inbound data path, and a control mechanism. The outbound data path includes a queued buffer for storing transactions in order of receipt from the primary bus where the requests in the queued buffer may be mixed as between read requests and write transactions, the outbound path also includes a number of parallel buffers for storing read reply data and address information.

The inbound path is a mirror image of the outbound path with read requests and write requests being stored in a sequential buffer and read replies being stored in a number of parallel buffers. Both the inbound path and the outbound path in the bus to bus bridge are controlled by a state machine which takes into consideration activity in both directions and permits or inhibits bypass transactions. Bypass herein means that a subsequent transaction may be allowed to be processed before a prior transaction, even though the prior transaction entered the queue earlier than the subsequent transaction.

It is a feature of the present invention that inbound and outbound transaction requests may be handled in nonsequential order under the control of a predetermined state machine.

It is another feature of the present invention that inbound and outbound transactions in a bus to bus bridge can be efficiently handled by a mechanism which allows read transactions to follow write transactions without requiring buffers to be flushed out.

It is another feature of the present invention that proper data consistency be maintained relative to the different transactions as they traverse a bus to bus bridge.

Other transactions such as Read requests must be completed (data fetched) on the destination bus prior to completing on the initiating bus. With the features of the present invention, processing of transactions such as a Read access can progress without flushing Posted Writes.

A Posted Read herein means that the target acknowledges the access and signals that it is busy and then terminates the access with Retry. The master will try the access again later. The bus to bus bridge then posts the Read request for subsequent processing such that it may have the Read data available when the master tries the access again later. If the master tries again before the bus to bus bridge obtains the requested data, the bridge again signals Retry but does not buffer a second copy of the access request.

These techniques can be applied to host bus bridges and to adapter devices that also post write and read transactions in addition to bus to bus bridges.

The foregoing has broadly outlined the features and technical advantages of the present invention in order that the detailed description of the invention which follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference will be made to the following description taken in conjunction with the accompanying drawing, in which.

DETAILED DESCRIPTION OF A PREFERRED EMBODIMENT OF THE INVENTION

Figure 1:
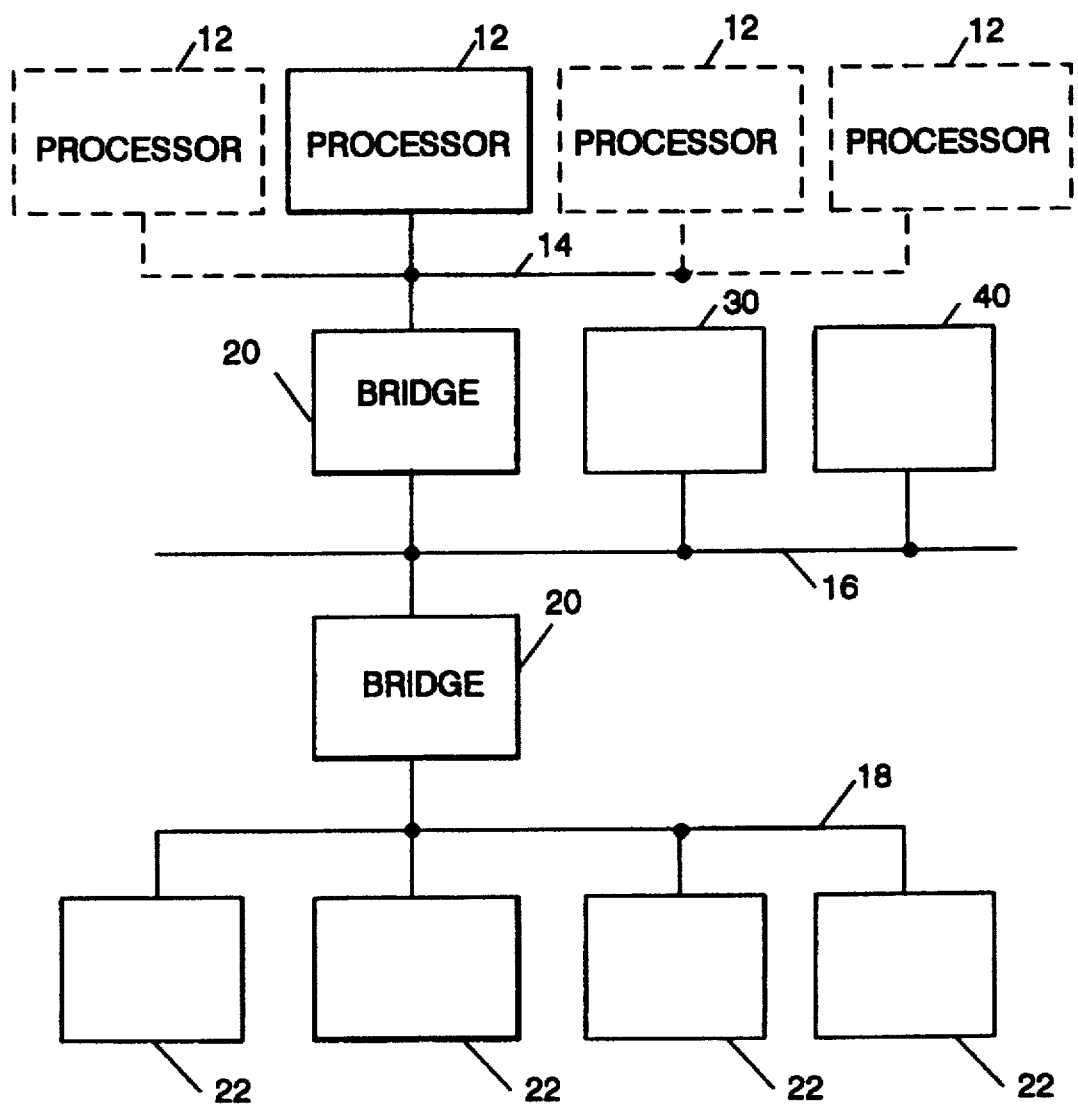
FIG. 1 is a block diagram of a data processing system embodying the present invention.

Referring now to FIG. 1, a data processing system embodying the present invention will be described.

System 10 includes a host processor 12 connected to a first bus 14. Other processors 12 shown in dotted lines on FIG. 1 may also be connected to bus 14.

Also connected to bus 14 is bus to bus bridge 20 which connects between first bus 14 and a second bus 16. Other devices 30, 40 may be connected to bus 16 as well. Additionally, another bridge 20 is connected to bus 16 and to a third bus 18. Also connected to bus 18 may be a number of stations or peripheral devices 22. Other than bridge 20, each of the elements referenced above with respect to FIG. 1 are all well known in the art and need not be described in greater detail herein.

As an example, but in no way limiting the scope of the invention, buses 14, 16, and 18 each may be a PCI bus which has become an industry standard.

Figure 2:
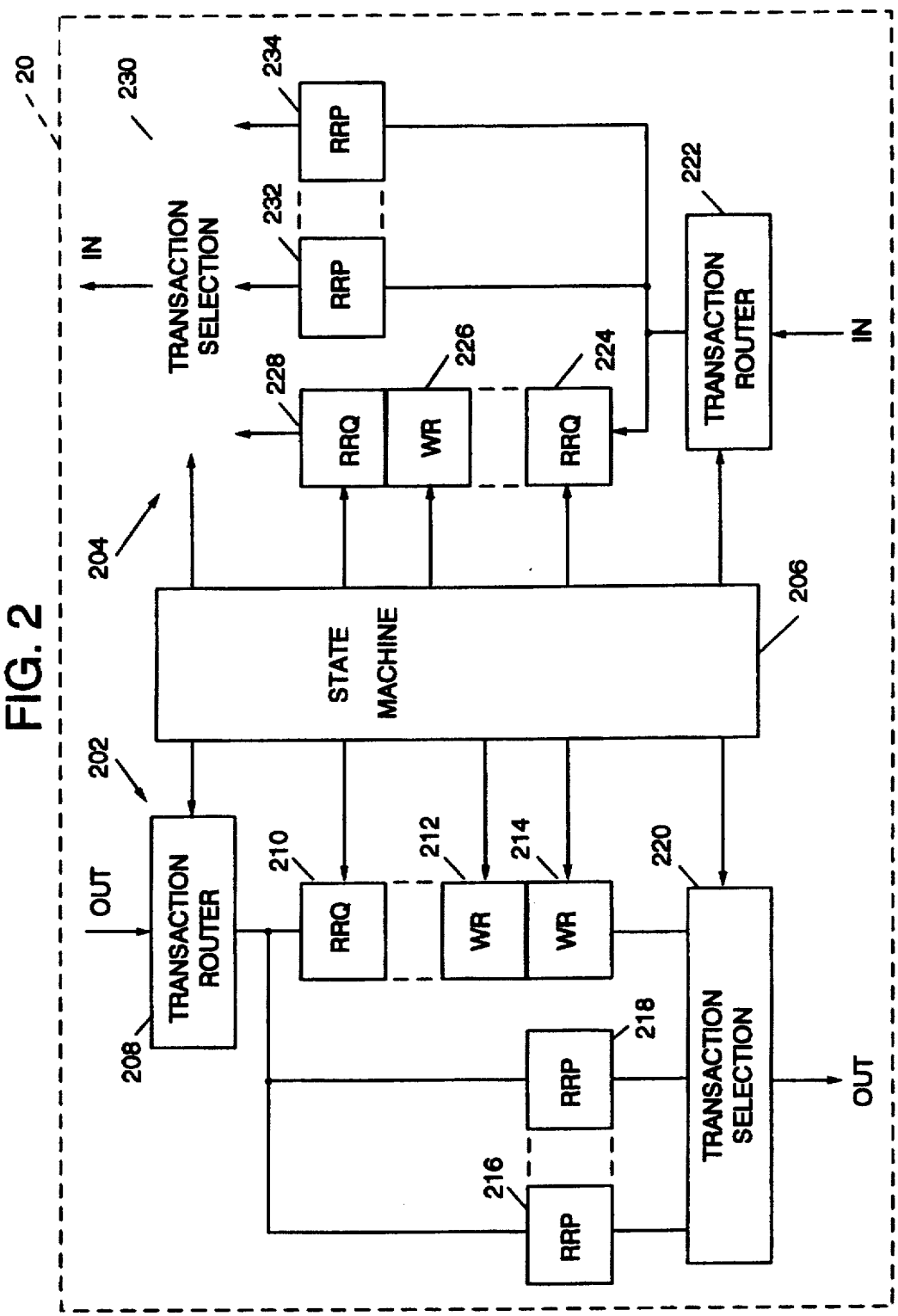
FIG. 2 is a block diagram of a bus to bus bridge illustrating features of this invention in accordance with the system of FIG. 1.

Referring now to FIG. 2, bus to bus bridge 20 will be described in greater detail. As used in this description of the preferred embodiment of the invention, the term outbound refers to those transactions which are away from the processor and inbound refers to those transactions which are toward the processor.

Bridge 20 has two data paths, outbound path 202 and inbound path 204. All transactions inbound and outbound are controlled by state machine 206.

When an outbound transaction is received by transaction router 208, the transaction format is examined to determine whether the transaction is a read request, a read reply, or a write request.

A read request has a format of an address and control information. A read reply has a format which includes an address, control information and the data which had been requested and which is now being sent to the original requestor.

A write transaction includes an address, control information and the data which will be written into the selected address.

Assuming, for example, that the transaction currently active in transaction router 208 is a read request, the transaction will be forwarded to one of a number of sequential buffers 210, 212, 214. The sequential buffer entries 210, 212, 214 may be any appropriate number of buffer entries in length adequate to handle the stack of transactions anticipated to be pending in bridge 20.

If the transaction pending in transaction router 208 is a read reply, the read reply transaction is transmitted to one of parallel buffer entries 216, 218.

At any time, the transaction to be selected and passed to a secondary bus by transaction selection circuit 220 is controlled by state machine 206. This allows, for example, out of sequence accesses to transactions stored in sequential buffers 210, 212 or 214 or to a read reply transaction in parallel buffers 216, 218.

The inbound path 204 includes the same elements as outbound path 202 except the elements are connected in the reverse order. That is, transaction router 222 is connected to the secondary bus 16 or 18 (see FIG. 1). As explained above with reference to outbound transaction router 208, inbound transaction router 222 is controlled by state machine 206. Each transaction is routed to one of the sequential inbound buffers 224, 226, and 228 for read request and write transactions. Read reply transactions are transmitted to parallel buffers 232, 234. Inbound selection circuit 230 under the control of state machine 206 controls transmission of transactions from either sequential buffers 224, 226 or 228 or from parallel buffers 232 or 234 respectively.

Figure 3:
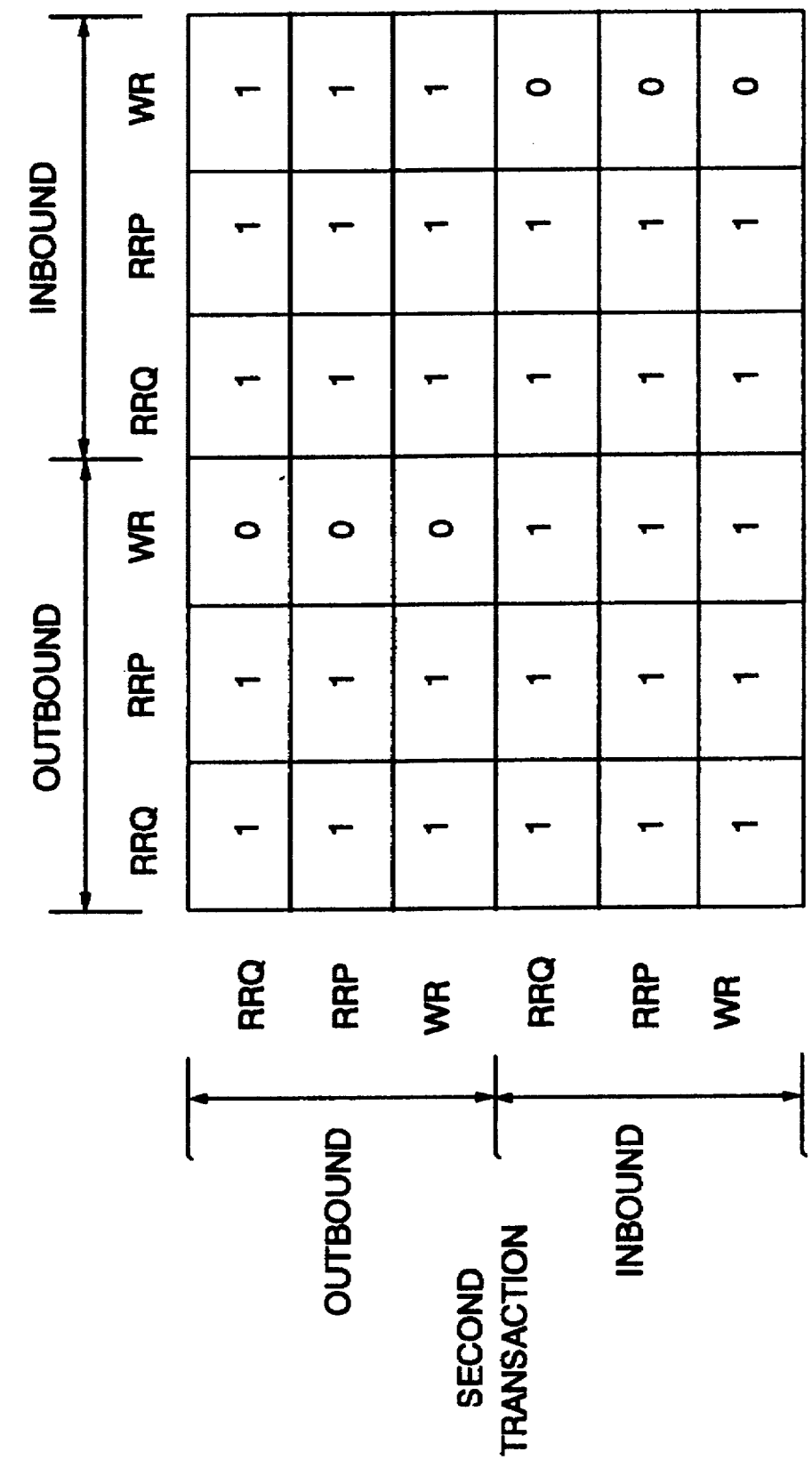
FIG. 3 is a logic table showing control of inbound and outbound transactions in the bridge of FIG. 2 for each type of transaction on both the outbound and the inbound path.

State machine 206 operates under a protocol which is defined by the state machine logic table shown in FIG. 3 to control multiple transactions flowing either outbound or inbound or both.

Referring now to FIG. 3, the logic table which controls state machine 206 will be described. Across the top of the logic table are transactions which represent either outbound or inbound transactions and which will be referred to for convenience as a first transaction. Along the left side of the logic table are outbound and inbound transactions which will be referred to for convenience as second transactions.

If, for example, there is an outbound first transaction which is a read request, and an outbound second transaction which is a read request, the intersection of the column and row in the logic table indicate a one. A one in any position in the logic table indicates a permitted out of sequence bypass transaction. A zero in any position of the logic table of FIG. 3 indicates a prohibited bypass transaction. Thus, an outbound read request as a first transaction followed by an outbound read request as a second transaction are permitted to be bypassed by the second transaction. To bypass means to complete on the destination bus a second request prior to completion of a first request. However, if the first transaction is, for example, an outbound write transaction, bypass of an outbound read request is prohibited.

It should be noted that all positions in the logic table where there is a zero indicating a prohibited bypass transaction involve write transactions. For example, an outbound Read request cannot bypass an outbound write, nor can an outbound Read reply or write bypass another outbound write. For inbound transactions, the same holds true. Thus, an inbound Read request, Read reply or write transaction may not bypass an earlier inbound write transaction. This logic table which controls state machine 206 controls the gating of transactions in transaction routers 208 and 222 and transaction selection circuits 220 and 230 respectively.

An outbound read request may bypass earlier outbound read requests. Outbound read requests may bypass earlier outbound read replies. Outbound read requests may not bypass earlier write transactions. This is to prevent a read of a register previously written, from being performed before the write transaction arrives thus causing the reading of incorrect data.

Outbound read replies may bypass earlier outbound read requests or read reply transactions. For a generalized bus to bus bridge, an outbound read reply may not bypass an earlier outbound write transaction to prevent an interrupt arriving early indicating a device has completed a memory write allowing access to the subject write data, before the write to memory is performed. In a less general system where this interrupt race is only of concern for the inbound case, then an outbound read reply may be allowed to bypass an earlier write transaction.

Outbound write transactions may bypass earlier outbound read requests. This is due to the fact that a Read request is only a request until it completes and has not occurred in terms of data ordering, therefore, a Write transaction may be allowed to bypass the Read request.

Outbound write transactions may not bypass earlier outbound write transactions. This is to assure that write transactions on one bus that also traverse a bridge complete in the same order on both buses.

Relative to inbound versus inbound transactions, an inbound read request may bypass earlier inbound read requests. Inbound read requests may bypass earlier inbound read replies.

Inbound read requests may not bypass earlier inbound write transactions to prevent a read of a register previously written from being performed before the write data arrives.

Inbound read replies may bypass earlier inbound read requests and read replies. Inbound read replies may not bypass earlier inbound write transactions to prevent an interrupt arriving early indicating a device has completed a write to system memory and the processor reading the memory location before the subject write to memory is performed.

Inbound Write transactions may bypass inbound Read replies and Read requests.

Inbound write transactions may not bypass earlier inbound write transactions. As before, this is to assure that write transactions on one bus that also traverse a bridge complete in the same order on both buses.

It should be noted that any outbound transaction may bypass an earlier inbound transaction and that any inbound transaction may bypass any earlier outbound transaction. This is possible since these transactions are directed to different address spaces. For cases where any outbound versus inbound transaction or any inbound versus outbound transaction requires ordering, it is handled by software protocols beyond the scope of this invention.

A master that attempts a read access and is retried, must periodically try the access again until it completes.

If non-prefetchable read reply data remains in a buffer in the bus to bus bridge beyond its timeout period, the bus to bus bridge activates a system error, signalling to the system that the bridge has a stalled buffer of non-prefetchable read data.

Although the present invention and its advantages have been described in detail, it should be understood that various changes, substitutions and alterations can be made herein without departing from the spirit or scope of the invention as defined in the appended claims.

What is claimed is:

1. A data processing system, comprising:
   one or more processors;
   one or more peripheral devices;
   a plurality of buses connecting said one or more processors and said one or more peripheral devices through one or more bridges; and
   one or more bridges for controlling transactions between a first bus and a second bus of said plurality of buses, each said bridge comprising:
   a first data path for handling transactions from said first bus to said second bus;
   a second data path for handling transactions from said second bus to said first bus;
   a controller for controlling gating and sequence of transactions between said first bus and said second bus through said first data path and said second data path;
   wherein said controller further comprises a state machine for controlling transactions through said first data path and said second data path;
   wherein said state machine controls gating of transactions in said first and second data paths in accordance with a predetermined logic structure; and
   wherein said predetermined logic structure further comprises means for controlling read transactions and write transactions to eliminate flushing write buffers prior to read transactions being gated through said controller.

2. A data processing system according to claim 1, wherein said first data path and said second data path each further comprise:
   a transaction router circuit connected to an input to said bridge for gating transactions to buffers in said data path;

one or more buffers connected to said transaction router circuit for storing read reply transactions;

two or more buffers connected to said transaction router circuit for storing read request transactions and write transactions;

a transaction selection circuit connected to outputs of said buffers for selecting one or more transactions to be outputted from said data path under the control of said controller.

3. A data processing system according to claim 1 wherein said first data path is an outbound data path.

4. A data processing system according to claim 1 wherein said second data path is an inbound data path.

5. The data processing system, as recited in claim 1, wherein said state machine includes means for allowing predetermined subsequent transaction types to be gated through said data paths ahead of predetermined previous transaction types in accordance with said predetermined logic structure.

6. The data processing system, as recited in claim 1, wherein said state machine includes means for preventing predetermined subsequent transaction types from being gated through said data paths ahead of predetermined previous transaction types in accordance with said predetermined logic structure.

7. A method for controlling a plurality of transactions from a first bus to a second bus through a bridge, in a data processing system comprising one or more processors, one or more peripheral devices, a plurality of busses connecting the one or more processors and the one or more peripheral devices through one or more bridges, and one or more bridges for controlling transactions between the first bus and the second bus of the plurality of busses, said method comprising the steps of:

providing a first data path for handling transactions from the first bus to the second bus;

providing a second data path for handling transactions from the second bus to the first bus;

providing a controller for controlling gating and sequence of transactions between the first bus and the second bus through the first data path and the second data path; and controlling, by the controller, read transactions and write transactions through the first and second data paths in accordance with a predetermined logic structure to eliminate flushing write buffers prior to read transactions being gated through the data paths.

8. The method, as recited in claim 7, further including the step of allowing predetermined subsequent transaction types to be gated through said data paths ahead of predetermined previous transaction types in accordance with said predetermined logic structure.

9. The method, as recited in claim 7, further including the step of preventing predetermined subsequent transaction types from being gated through said data paths ahead of predetermined previous transaction types in accordance with said predetermined logic structure.

10. A data processing system, comprising:

one or more processors;

one or more peripheral devices;

a plurality of buses connecting said one or more processors and said one or more peripheral devices through one or more bridges;

one or more bridges for controlling transactions between a first bus and a second bus of said plurality of buses, each said bridge comprising:

a plurality of data paths for handling transactions between said first and second buses;

buffer means for storing write transactions and for storing read transactions, with multiple read and write transactions being allowed to reside in said bridge at the same time; and a controller for controlling gating and sequence of said read and write transactions between said first and said second bus through said data paths without first flushing said write transactions from said buffer means.

11. A bus-to-bus bridge, comprising:

a plurality of data paths for handling transactions between a first bus and a second bus;

buffer means for storing write transactions and for storing read transactions, with multiple read and write transactions being allowed to reside in said bridge at the same time; and a controller for controlling gating and sequence of said read and write transactions between said first bus and said second bus through said data paths without first flushing said write transactions from said buffer means.

12. A method for controlling a plurality of transactions between a first bus and a second bus through a bridge, said method comprising the steps of:

providing a plurality of data paths in the bridge for handling transactions between said first and second buses;

storing write transactions in a plurality of buffers in the bridge;

storing read transactions in said plurality of buffers, with multiple read and write transactions being allowed to reside in said bridge at the same time; and controlling gating and sequence of said read and write transactions between said first and second buses through said data paths without first flushing said write transactions from said buffers.

* * * * *